(12) United States Patent
Pagnozzi

(10) Patent No.: US 10,344,218 B2
(45) Date of Patent: Jul. 9, 2019

(54) HIGH TEMPERATURE THERMAL MODIFICATION PROCESS OF WOOD IN A VACUUM AUTOCLAVE

(75) Inventor: Ernesto Pagnozzi, Terni (IT)

(73) Assignee: WDE MASPELL S.R.L., Terni (IT)

( * ) Notice: Subject to any disclaimer, the term of this patent is extended or adjusted under 35 U.S.C. 154(b) by 432 days.

(21) Appl. No.: 14/126,688

(22) PCT Filed: Jun. 15, 2012

(86) PCT No.: PCT/IT2012/000180
§ 371 (c)(1),
(2), (4) Date: Dec. 16, 2013

(87) PCT Pub. No.: WO2012/172585
PCT Pub. Date: Dec. 20, 2012

(65) Prior Publication Data
US 2014/0124354 A1    May 8, 2014

(30) Foreign Application Priority Data

Jun. 16, 2011   (IT) .............................. RM2011A0314

(51) Int. Cl.
*C10B 29/00*   (2006.01)
*B27K 5/00*   (2006.01)
(Continued)

(52) U.S. Cl.
CPC .............. *C10B 29/00* (2013.01); *B27K 5/009* (2013.01); *B27K 5/0075* (2013.01); *C10B 53/02* (2013.01);
(Continued)

(58) Field of Classification Search
CPC .................................................. C10B 29/00
See application file for complete search history.

(56) References Cited

U.S. PATENT DOCUMENTS 2,296,546 A * 9/1942 Toney .................... B27K 5/001
34/411
2,422,557 A * 6/1947 Kobiolke ............. B27K 5/0075
34/350
(Continued)

FOREIGN PATENT DOCUMENTS

EP   1488851   12/2004
EP   2269787   1/2011
(Continued)

OTHER PUBLICATIONS

EP Communication dated Dec. 12, 2013.
International search report PCT/IT2012/000180, dated Mar. 1, 2013.

*Primary Examiner* — Sean E Conley
*Assistant Examiner* — Matthew D Krcha
(74) *Attorney, Agent, or Firm* — Tarter Krinsky & Drogin LLP

(57) ABSTRACT

A process for the thermal-chemical modification treatment of wood is described, in which such a modification is obtained through multiple chemical reactions of the substances comprising the wood structure generated by exposing the wood to temperatures at which the pyrolysis phenomenon begins, i.e., in the range of 180° C.-240° C., in a vacuum autoclave-cell while always maintaining the internal pressure lower than the atmospheric pressure, in a range of values of 70-350 mBar of absolute pressure, consisting in the steps of pre-heating, actual heat treatment, and cooling of a wood mass.

8 Claims, 4 Drawing Sheets

(51) Int. Cl.
  *C10B 53/02* (2006.01)
  *C10L 5/44* (2006.01)
  *C10L 9/08* (2006.01)
  *F26B 5/04* (2006.01)
  *F26B 21/02* (2006.01)

(52) U.S. Cl.
  CPC ............... *C10L 5/442* (2013.01); *C10L 9/083* (2013.01); *F26B 5/04* (2013.01); *F26B 21/02* (2013.01); *F26B 2210/16* (2013.01); *Y02E 50/10* (2013.01); *Y02E 50/14* (2013.01); *Y02E 50/15* (2013.01); *Y02E 50/30* (2013.01)

(56) References Cited

U.S. PATENT DOCUMENTS

| | | | | |
|---|---|---|---|---|
| 3,521,373 A | * | 7/1970 | Pagnozzi | F26B 3/20 34/406 |
| 4,194,296 A | * | 3/1980 | Pagnozzi | F26B 5/04 34/410 |
| 4,223,451 A | * | 9/1980 | Pagnozzi | F26B 3/04 34/410 |
| 4,345,384 A | * | 8/1982 | Pagnozzi | F26B 3/00 34/411 |
| 4,893,415 A | * | 1/1990 | Moldrup | F26B 5/04 34/406 |
| 5,575,083 A | * | 11/1996 | Lee | F26B 5/048 34/255 |
| 2003/0068258 A1 | | 4/2003 | Chung et al. | |
| 2003/0182819 A1 | * | 10/2003 | Michon | B27K 5/009 34/396 |

FOREIGN PATENT DOCUMENTS

| | | |
|---|---|---|
| FR | 2786424 | 6/2000 |
| IT | 1187959 | 2/1986 |
| WO | 0185410 | 11/2001 |
| WO | 2008079000 | 7/2008 |

* cited by examiner

HIGH TEMPERATURE THERMAL MODIFICATION PROCESS OF WOOD IN A VACUUM AUTOCLAVE

TECHNICAL FIELD

The present disclosure relates to a process of high-temperature heat treatment of wood in a vacuum autoclave, suitable to produce the modification of the wood structure through multiple chemical-physical reactions of the substances comprising it, generated by exposing the wood to temperatures at which the pyrolysis phenomenon begins (180° C.-240° C.), in any case while preventing the combustion thereof.

PRIOR ART

In this paragraph, the current state of the art is described. In this regard, it is worth stating that the heat treatment processes of wood currently used in the industry substantially consist in the sequence of the following three steps:
1. pre-heating of pre-dried wood to humidity values close to zero within a cell until when the temperature thereof reaches the temperature at which the pyrolysis begins, of about 180-230° C., with measures to prevent the combustion thereof;
2. actual heat treatment, consisting in maintaining the wood at the preset temperature for a preset period of time, while in any case and always preventing the combustion thereof;
3. cooling of wood until bringing it to temperatures in any case below 100° C., in order to subsequently be able to expose the wood material to the external environment without combustion dangers and/or thermal shock problems.

Currently, three technologies are known to obtain thermal-treated wood, which are described herein below while pointing out the features thereof.

1. Heat Treatment at the Atmospheric Pressure in Cells with Superheated Vapour Heating (Finnish Method).

The stack, composed of the wood pre-arranged in battens and dried in other devices, is loaded within a cell that is suitably insulated and made impermeable to vapour, similar to a conventional wood drying cell, provided with internal fans to generate the circulation of the heating fluid through the stack, in the present case, vapour superheated at a temperature of 150-230° C., provided by an external vapour generator and rigorously kept, for obvious safety reasons, at atmospheric pressure, by means of a duct and/or safety chimney open to the atmosphere, which the cell has necessarily to be provided with to prevent dangerous internal overpressures.

The wood is protected against triggering of combustion, since it is heated at the heat treatment temperature of 180-230° C. in an environment that is inert, since the air initially existing therein (therefore, the oxygen contained therein) has been replaced by the superheated vapour.

Therefore, the first two steps, i.e., pre-heating and treatment, are carried out with the same method using a superheated vapour circulation.

The third step, i.e., cooling, is carried out by interrupting the superheated vapour inlet and injecting demineralised water into the cell by means of special sprayers that provide to "atomize" the water jet, which, being instantly converted into vapour, subtracts heat to the treatment cell, in a ratio of about 540 Kcal per liter of evaporated water, thus carrying out the cooling of the wood contained therein; the so-generated vapour is discarded into the atmosphere via the above-mentioned "chimney".

Of course, there are some variants in the method for producing the heating vapour, which will be omitted herein for sake of brevity, but which anyway always find their origin in the use of superheated vapour as a heating and inertization medium of the cell.

The limits of this technique consist in the following points:
drying: the wood to be treated has to be pre-dried in another device in order to low the humidity values, then cooled, and finally fed into the treatment cell to be heated again, with a large waste of time, labour force, and above all thermal energy;
heating: there is the need to install a vapour generator equipped with all the safety measures that are required for the use thereof;
inertization: it is carried out by means of an injection of superheated vapour;
cooling: in order to lower the wood temperature from 230° C. to 100° C., a subtraction of thermal energy is necessary, equal to about 45.000 Kcal/m3, which corresponds to a consumption of demineralised water of 70-80 liters per m3 treated wood, and the consequent production of about 150 m3 vapour per m3 treated wood;
pollution: the water vapour exiting the chimney of the cell inevitably acts as a vehicle for a significant set of gases and volatile chemicals resulting from the chemical conversion of wood (resins, hemicelluloses, cellulose, etc). Therefore, it is important to know that a heat treatment chamber with 10 m3 stowage of wood produces 1.500 m3 potentially pollutant vapour per treatment cycle;
safety: it shall be apparent that, in the case of lack of power supply due to an external and/or internal failure of the machinery, the internal temperature is anyhow to be maintained in some way, to prevent the heating vapour from condensing within the cell, thus drastically decreasing its volume and sucking in air from the external environment via the safety chimney, thereby the wood mass could instantly ignite.

2. Heat Treatment at the Atmospheric Pressure in a Cell Saturated with Inert Gas (Nitrogen)

The process is similar to the previous one, except for the variation that the interior of the cell is saturated with nitrogen, which, being a inert gas, prevents the triggering of the combustion of the wood material.

The limits of this technique consist in the following points:
drying: see the previous case;
heating: the system is provided with diathermic oil-internal fluid and/or electric heat exchangers, as well as with fans for the circulation of nitrogen through the wood stack;
inertization: it is carried out by means of a nitrogen injection, so that the system has to be equipped with a nitrogen generator and/or a suitably sized storage reservoir, since the gas consumption is significant; furthermore, the system has to be provided with an expensive oxygen concentration analyzer to ensure that its concentration is always lower than the dangerous thresholds.
cooling: see the previous case;
pollution: see the previous case;

safety: the occasional lack of voltage is more easily manageable than the previous method; however, special care has to be paid to the constant monitoring of the oxygen concentration within the cell, to prevent combustion risks. Furthermore, it is absolutely necessary to provide for an accurate and safe disposal of the inertization nitrogen from the cell at the end of the process, to avoid, upon opening the same, the suffocation danger due to nitrogen inhalation for the staff.

3. Treatment with Superheated Vapour in Pressurized Autoclave

Such process completely differs from the two previous processes, and consists in the feeding of the wood into a suitably insulated autoclave and suitable to resist an internal pressure up to 19 Bar.

The heating is carried out by directly injecting superheated vapour into the autoclave, therefore it does not provide for the arrangement of ventilation devices and/or internal exchangers.

The process takes place according to the following steps:
1. pre-heating: after carrying out a pre-vacuum with a residual pressure of 200 mBar, superheated vapour produced by a special generator is fed into the cell, until when the wood reaches the treatment temperature of 180-230° C.;
2. treatment: the temperature is kept at the desired value by means of an appropriate vapour feed;
3. cooling: it is carried out with water spraying, as in the previous methods, and ends with a final vacuum, followed by an external air feed.

The limits of this technique consist in the following points:
drying: see the previous cases;
heating: there is the need to install a vapour generator equipped with all the safety measures that are required for the use thereof;
inertization: it is carried out with an injection of superheated vapour;
cooling: see the previous cases;
pollution: see the previous cases;
safety: the cell, since it is a pressurized autoclave, has to be subjected to the periodic inspections provided by the laws in force.

BRIEF DESCRIPTION OF THE INVENTION

The process that is the object of the present patent application has as its aim to overcome most of or all the limitations described above with reference to the prior art, and it is characterised in that the treatment of wood in order to prevent the combustion thereof is carried out by totally eliminating the oxygen contained in the cell, by first dramatically reducing the initial amount thanks to the partial vacuum created in the cell that makes the air extremely rarefied, since it is brought to an absolute pressure of 70-350 mBar, and subsequently by totally consuming the small residual quantity of oxygen, by inducing a driven microcombustion of an infinitesimal portion of the wood mass subjected to the treatment. This phenomenon is defined by the Author as "self-inertization of wood", since it is the wood itself to generate its own inertization, by sacrificing a negligible part of its matter.

Such thermal-chemical reactions induce the following macroscopic modifications in the wood characteristics:
1. COLOUR: change (darkening) and homogenization of the colour through the entire thickness of the wood, the intensity of which can be controlled by proper adjustments of the process parameters, i.e., temperature, pressure, and exposure time;
2. DURABILITY: improvement of its durability, in the sense that the treated wood becomes more resistant to the attacks of fungi and other xylophagous microorganisms; therefore, "softwood" species rated durability Class 5, such as conifers (such as fir, pine, and larch) easily available and having a low economic value, can reach Class 1, which is typical of "hardwoods", known as very durable (such as oak, chestnut, and teak), the economic value of which can be of 3-10 times above that of conifers;
3. HYGROSCOPICITY: reduction of its hygroscopicity, i.e., of its ability in uptaking or absorbing the humidity from the surrounding environment, thus making it almost insensitive to weather variations (temperature and air humidity);
4. DIMENSIONAL STABILITY: as a consequence of the hygroscopicity decrease, the wood acquires a high dimensional stability against the variations of the environmental humidity, which results in an improvement of the quality of the finished products (furniture, wood flooring, fixture, musical instruments, etc.) that become virtually insensitive to weather variations;
5. MECHANICAL CHARACTERISTICS: a 10-15% worsening of some mechanical characteristics (tensile, compressive, and shear resistance), but an important improvement in its hardness have been detected; in other terms, the thermal-treated wood becomes slightly more fragile, but harder. This phenomenon, which could be partially limiting in regard to the implementation of structural beams for the building sector, is absolutely advantageous in any other applications, since the increase in the hardness facilitates not only some of the processing operations of the wood material, such as smoothing and painting, but allows obtaining manufactured articles that are more resistant to accidental scratches, which is a fundamental result for the final quality of the finished products, such as flooring, furniture, and window and door frames, etc.

It is necessary to point out that the wood, even before being subjected to the heat treatment temperatures, must be however dried to final moisture values near to zero, to prevent that the residual water contained in the cell walls of the wood material, brought to temperatures of 180-230° C., generates such pressures as to produce a collapse thereof, resulting in irreparable damages.

Further characteristics and advantages of the invention will be apparent from the following detailed description, given by way of non-limiting example only, with reference to the annexed drawings.

DETAILED DESCRIPTION

Figure 1A:
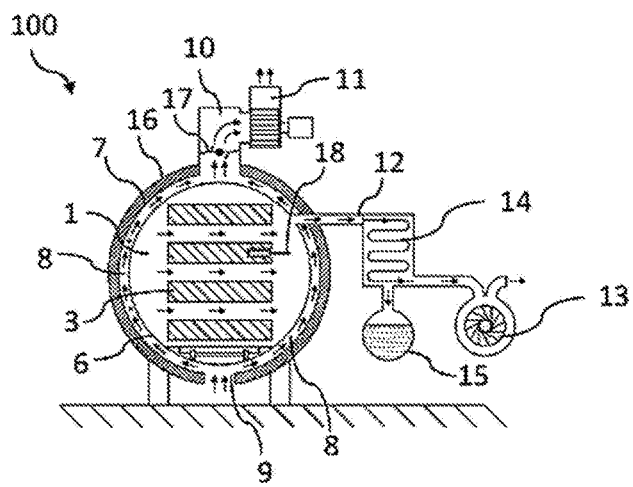
FIGS. 1a-1c schematically show sectional views of a first embodiment of an apparatus for the heat treatment of wood.

The process described herein below aims to overcome all, or most of, the negative implications of the currently existing processes, while maintaining a far superior quality of the final product, and more precisely:

drying: carried out in a watertight cell, preferably devised so as to perform the dual function of vacuum drier and heat treatment device, so as to avoid the transposition of the wood stack from a machine to another, with great saving of time, labor force, and above all thermal energy.

heating: carried out in a partial vacuum through forced circulation of rarefied air (closed circuit) through the wood stack and special heat exchangers that use any source of thermal energy (electricity, diathermic oil, superheated water) without the need for any injection of vapour and/or nitrogen and/or other gas.

inertization: according to a "SELF-INERTIZATION" process of the wood, thus not needing any injection of vapour and/or nitrogen and/or other gas to make the interior of the cell inert.

In order to understand the dynamics of the self-inertization phenomenon, first consider that the interior of the autoclave-cell (insulated and perfectly watertight) is a virtually adiabatic system, that is, it does not allow energy exchanges with the outside.

This means that, once the wood has been loaded into the cell, the system appears to be completely insulated and contains only the following elements: the wood to be heat-treated and the air that fills the remaining internal free volume.

When the wood reaches the pyrolysis temperature (180° C.-230° C.) at a pressure of 70-350 mBar, the internal atmosphere of the cell is formed by air that is made very rarefied, as seen, by the combined effect of vacuum and temperature, yet having an oxygen content that, while now being very low, could still induce a triggering of combustion of the wood.

Therefore, to assess the extent, therefore the potential hazard of the above-mentioned combustion phenomenon, it is desirable to know the amount of wood mass that could be induced to burn by the oxygen existing in the residual air contained within the autoclave-cell, once the operative point of the treatment has been reached.

Due to constructive causes of geometry, mechanics, and aerodynamics, whatever the internal dimensions of the autoclave-cell are, the ratio between the free volume of internal air and the net volume of the stowed wood is about 3:1=3. This means that per each m3 actually stowed wood, an amount of oxygen approximately equal to that contained in 3 m3 air at a room temperature of 25° C. and at an atmospheric pressure of 1013 mbar is available.

Physics teaches that air density varies when the temperature and pressure vary, and, in particular, it decreases when temperature increases and pressure decreases.

Some significant values for the present discussion are set forth in the following Table 1:

TABLE 1

Coeff. of air density reduction.

| State of the cell | Temperature ° C. | Pressure mBar | Air density Kg/m3 | Coeff. of air density reduction % |
|---|---|---|---|---|
| "Normal" initial state | 25° C. | 1013 mBar | 1.185 Kg/m3 | |
| 1° point of treatment | 180° C. | 350 mBar | 0.269 Kg/m3 | −77% |
| 2° point of treatment | 180° C. | 200 mBar | 0.154 Kg/m3 | −87% |
| 3° point of treatment | 180° C. | 70 mBar | 0.054 Kg/m3 | −95% |

From the Table, it follows that the air density reduction during the process is drastic and ranges between 77% and 95% compared to the density at normal temperature and pressure.

Applying such observation to the ratio of volume of internal air to volume of stowed wood (which initially was 3:1=3), it is as if the amount of available air would be reduced by a value equal to the coefficient of density reduction, i.e., according to the Table 2:

TABLE 2

Ratio of volume of internal air to volume of stowed wood.

| State of the cell | Temperature ° C. | Pressure mBar | Coeff. density reduction % | Ratio m3 air/m3 wood |
|---|---|---|---|---|
| "Normal" initial state | 25° C. | 1013 mBar | 0% | 3 |
| 1° point of treatment | 180° C. | 350 mBar | −77% | 0.69 |
| 2° point of treatment | 180° C. | 200 mBar | −87% | 0.39 |
| 3° point of treatment | 180° C. | 70 mBar | −95% | 0.15 |

From the analysis of the different values of the ratio air volume/wood volume in various operative points, it is seen that by increasing the temperature and reducing the pressure, the amount of available air is dramatically reduced together with the amount of available oxygen for a possible combustion.

Chemistry teaches that the amount of oxygen required to generate the combustion of 1 Kg wood mass under standard conditions (i.e., atmospheric pressure and a temperature of 25° C.) is approximately equal to that contained in 5 m3 air, from which the amount of "burnable" wood mass per m3 of stowed wood within the autoclave-cell depending on the parameters of temperature and pressure used during the treatment can be easily obtained:

TABLE 3

Amount of combustible wood.

| State of the cell | Temperature ° C. | Pressure mBar | Ratio m3 air/m3 wood | Amount of combustible wood Kg/m3 |
|---|---|---|---|---|
| "Normal" initial state | 25° C. | 1013 mBar | 3 | 0.6 Kg/m3 |
| 1° point of treatment | 180° C. | 350 mBar | 0.69 | 0.138 Kg/m3 |
| 2° point of treatment | 180° C. | 200 mBar | 0.39 | 0.06 Kg/m3 |
| 3° point of treatment | 180° C. | 70 mBar | 0.15 | 0.03 Kg/m3 |

Given that the Specific Gravity of the dry wood varies, for the European species, from 400 to 650 kg/m3, it is evident that the amount of wood mass possibly sacrificed in the combustion phenomenon due to the residual oxygen is infinitesimal, and it may be calculated as follows:

TABLE 4

Silver fir wood ( 400 Kg/m3): % mass loss by combustion.

| State of the cell | Temperature ° C. | Pressure mBar | Amount of combustible wood Kg/m3 | % mass loss by combustion |
|---|---|---|---|---|
| "Normal" initial state | 25° C. | 1013 mBar | 0.6 Kg/m3 | 0.15% |
| 1° point of treatment | 180° C. | 350 mBar | 0.138 Kg/m3 | 0.0345% |
| 2° point of treatment | 180° C. | 200 mBar | 0.06 Kg/m3 | 0.015% |
| 3° point of treatment | 180° C. | 70 mBar | 0.03 Kg/m3 | 0.0075% |

TABLE 5

Oak wood (650 Kg/m3): % mass loss by combustion.

| State of the cell | Temperature °C. | Pressure mBar | Amount of combustible wood Kg/m3 | % mass loss by combustion |
|---|---|---|---|---|
| "Normal" initial state | 25° C. | 1013 mBar | 0.6 Kg/m3 | 0.09% |
| 1° point of treatment | 180° C. | 350 mBar | 0.138 Kg/m3 | 0.021% |
| 2° point of treatment | 180° C. | 200 mBar | 0.06 Kg/m3 | 0.0092% |
| 3° point of treatment | 180° C. | 70 mBar | 0.03 Kg/m3 | 0.0046% |

In order to assess the dangers inherent in the combustion of the aforementioned tiny wood masses, it is necessary to know the amount of thermal energy released by the exothermic chemical process during the combustion thereof.

Given that the calorific value of wood is, as a maximum, equal to 4200 Kcal/kg, one can easily calculate the thermal energy released by the combustion process:

TABLE 6

Specific thermal energy released by the combustion of wood during the process.

| State of the cell | Temperature °C. | Pressure mBar | Amount of combustible wood Kg/m3 | Total thermal energy Kcal/m3 |
|---|---|---|---|---|
| "Normal" initial state | 25° C. | 1013 mBar | 0.6 Kg/m3 | 2520 Kcal/m3 |
| 1° point of treatment | 180° C. | 350 mBar | 0.138 Kg/m3 | 580 Kcal/m3 |
| 2° point of treatment | 180° C. | 200 mBar | 0.06 Kg/m3 | 252 Kcal/m3 |
| 3° point of treatment | 180° C. | 70 mBar | 0.03 Kg/m3 | 126 Kcal/m3 |

This energy, even if it were released instantaneously, is not capable of producing any significant temperature variation of the internal environment of the cell, and thereby it cannot create any danger either to the mechanical structure, or the wood, nor to the control staff.

In reality, the oxygen OR has not "disappeared", but it is combined with the carbon C of the wood during the exothermic chemical reaction of the combustion:

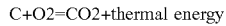

being converted into carbon dioxide, which, being an inert gas, prevents each additional combustion: from this the initial definition derives according to which the described process is a process of "SELF-INERTIZATION" of the wood.

It is clear that, this percentage of burnable wood being absolutely insignificant, the redox phenomenon which is the basis of the combustion of this small amount makes the internal atmosphere of the cell totally inert, since the small percentage of oxygen still present in the residual air before the combustion, combining with the carbon contained in the wood, is converted into carbon dioxide CO2, totally eliminating the number of oxygen molecules present in the cell, and making the final mixture of gases contained in the autoclave-cell totally inert.

It is worth analyzing the different compositions of the gas mixture within the cell before reaching the pyrolysis temperature and during the wood self-inertization process caused by the process described:

BEFORE: 78% nitrogen; 21% oxygen; 0.9% argon; 0.04% carbon dioxide; 0.06 others.

DURING: 78% nitrogen; 0.9% argon; 21.04% carbon dioxide; 0.06% others.

cooling: through a new and original method, for example, heat exchangers provide to transfer the heat of the wood from within the cell (which is constantly kept in partial vacuum and in a self-inertized environment) to the external atmosphere without supply of water and/or other gases and without production of pollutant vapor.

pollution: the apparatus does not produce any pollution to the external environment, since no gas and/or vapour can escape from its autoclave-cell, which is always at a pressure less than the atmospheric one. The possible small amount of residual water vapour and/or gases generated during the heat treatment are conveyed, before being sucked by the vacuum pump, through a suitable condenser that provides to reconvert them into the liquid phase, allowing an easy recovery thereof in a special reservoir, so as to be able to be subsequently discarded according to the laws in force.

safety: the only real danger that is run when heating the wood at temperatures above 160° C. is to trigger the combustion of the wood when air enters the treatment cell due to accidental causes.

Such event can occur due to causes that are external to the apparatus (temporary interruption due to failure of the power supply) or due to causes intrinsic to the machinery itself (failure or maloperation of a component of the machinery).

The possible external and internal faults, and an example of a technique practiced by the described procedure, are analyzed herein below.

In accordance with an embodiment, in order to obviate this drawback, because of which all the organs and sensors of the apparatus would be arrested, the apparatus has been provided with a safety system comprising the following elements:

a UPS continuity unit, capable of intervening continuously at the time of the general lack of voltage and supplying the control (PLC) and safety devices of the apparatus described herein below for a continuous period of at least 6 hours;

a telephone dialer that immediately alerts the managers (up to 4 persons) of the occurred lack of tension by voicemail and alert SMS;

a safety vacuum pump, having a relatively small capacity, suitable to maintain the vacuum existing in the cell at the right value, preventing the pressure in the cell from rising, ensuring that the oxygen concentration remains at insignificant values.

Given that the safety vacuum pump certainly has not a continuous operation, but, thanks to the perfect sealing of the autoclave, will have short periods of running alternated with long shutdown periods, the supply capacity of the UPS continuity unit will allow the apparatus to be in a stand-by step for a time even above 24 hours, and anyhow, in the case of a continuous operation, for a period of time not less than 6 hours.

This solution provides the great advantage of preserving the wood material, keeping it under the current conditions, so as to allow the apparatus to automatically restart the heat treatment cycle from the interruption point, without losing any information about the current state of the apparatus and the wood, and with the maximum safety.

To overcome the problem of a possible failure of one of the electrical components of the apparatus (motors, valves, sensors, etc.), in accordance with an embodiment, each component is supervised by a device (for example: magneto-thermal protections, auxiliary probes, etc.) that immediately alerts the PLC controller of the occurred failure, so that the PLC can take the appropriate measures:

immediate stop of all the components;
activation of the UPS continuity unit;
sending of telephonic alerts to operators via telephone dial;
activation of the safety vacuum pump to maintain the pressure in the cell at the desired value.

In this case again, the system immediately reacts, ensuring the preservation of the wood and allowing the technicians to intervene in order to obviate the drawback and restart the system.

In accordance with an embodiment, in any case the apparatus can be provided with an emergency system against the possibility of fire of the wood contained in the cell: such system provides for the inertization of the interior of the cell by means of an input of nitrogen or water.

Should the remote event of a fire ignition within the cell occur, for a cause such as, for example, a loss of watertight seal that makes the environment air to enter the cell, resulting in an increased concentration of oxygen, therefore the initiation of a combustion, special pressure and temperature sensors alert the PLC controller, which provides to activate the RAPID INERTIZATION process, substantially consisting in the following operations:
immediate stop of all the components;
activation of the UPS continuity unit;
sending of telephonic alerts to the operators via a telephone dialer;
feeding of nitrogen or spraying of water into the cell via a special electro valve, so as to saturate the internal volume of the cell with a gas or a vapour, until when the internal pressure of the cell is equal to or slightly above the atmospheric pressure, thereby preventing the environment air from entering the cell and suffocating in any case the combustion of the wood;
Activation of the cooling system, so as to quickly lower the temperature of the cell to values below 100° C., which are well below the combustion temperature (160° C.).

From the foregoing, it shall be apparent that the described apparatus is capable of implementing a process suitable to carry out in sequence and/or separately the two physical processes:

1. Drying, preferably in vacuum, of the wood at temperatures ranging between 50° C. and 100° C., depending on whether it is hardwood or softwood, with a pressure ranging between 50-350 mbar, for example, ranging between 125 and 250 mbar;
2. heat treatment of wood in vacuum with absolute pressures ranging between 70-350 mBar and with temperatures ranging between 160-240° C., and comprising the three steps of:
pre-heating, until the operative temperature has been reached;
actual heat treatment;
cooling of the wood mass by means of a new method that does not provide for the use of water evaporation to cool the wood.

With reference to the annexed Figures, in accordance with an embodiment, the apparatus 100 comprises the following elements:
1. a vacuum-tight treatment chamber (internal chamber of the autoclave-cell 1) suitable to contain the wood, that is, the wood mass 3 to be treated, provided with a watertight door 4 for feeding and withdrawing wood;
2. a carriage 2 supporting the wood stack that has to be subjected to the treatment;
3. a heating system of the interior of the autoclave-cell 1, which can comprise electrical batteries 5A, 5B, or radiators with finned tubes for a heating by means of vapour and/or diathermic oil, or a diathermic oil jacket external to the drying cell;
4. a ventilation system comprising a series of fans 6A, 6B suitable to transfer the thermal energy from the heating system to the wood material by circulation of the gas within the cell;
5. a vacuum pump unit 13-15, comprising a vacuum pump, and a condenser 14 that is interposed between the pump and the treatment chamber of the autoclave-cell 1, so as to condense any vapours and/or gases exiting the wood, in order to be able to provide for the storage thereof in a suitable reservoir, so as to be able to provide for the disposal thereof according to the law requirements;
6. a wood cooling system, which may vary in the implementation thereof according to the heating method type, but which still does not use water spraying within the cell;
7. a safety and alarm system that allows managing potential danger situations.

Figure 2A:
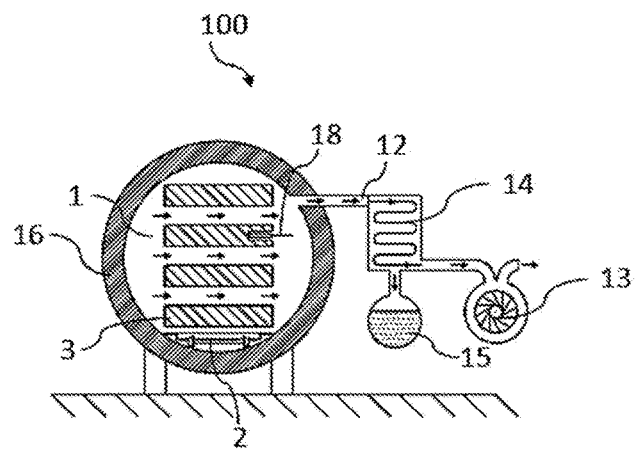
FIGS. 2a-2c schematically show sectional views of a second embodiment of an apparatus for the heat treatment of wood.
Figure 2B:
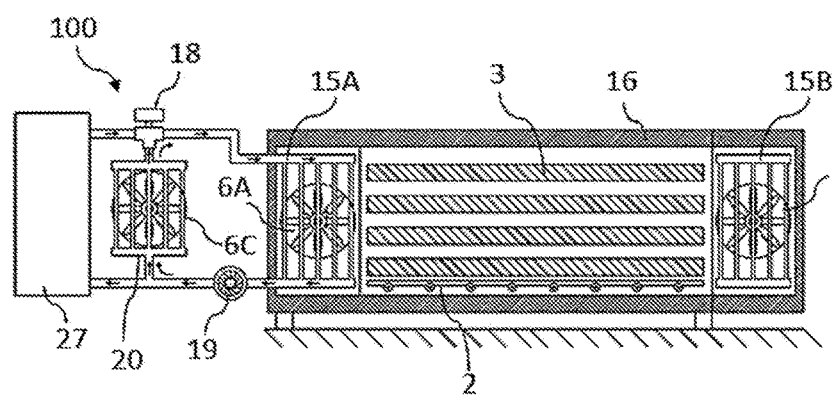
Figure 2C:
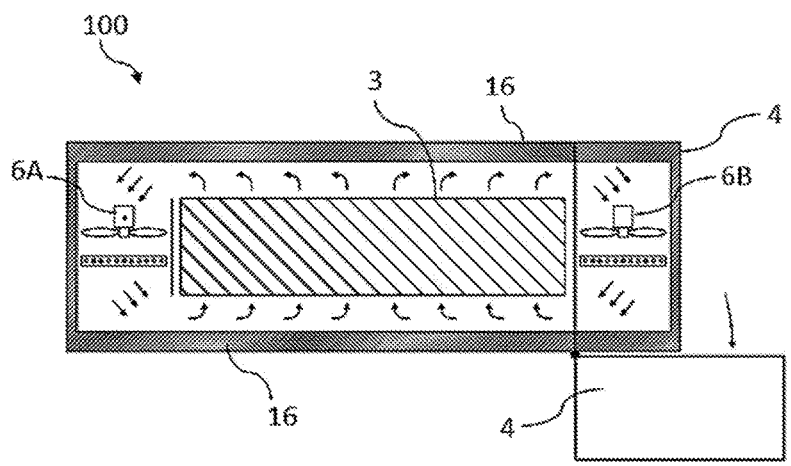
Figure 3A:
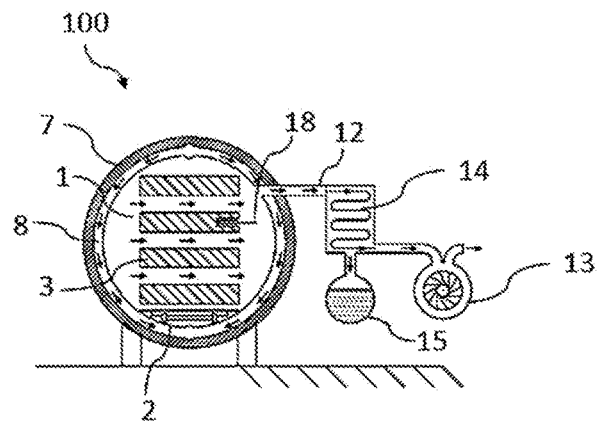
FIGS. 3a-3c schematically show sectional views of a third embodiment of an apparatus for the heat treatment of wood;
the FIG. 4 shows a perspective view of the apparatus of FIG. 1.
Figure 3B:
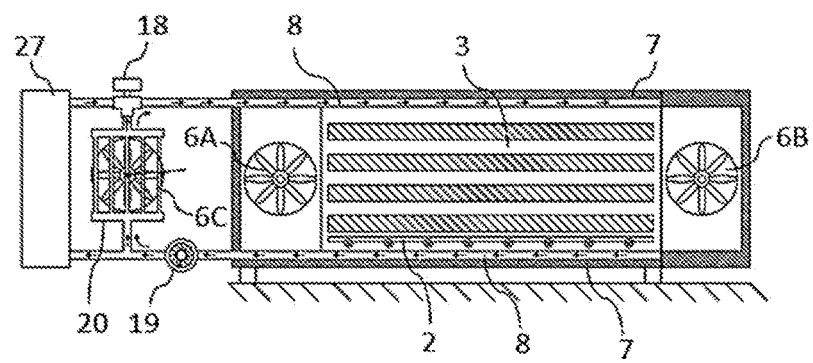
Figure 3C:
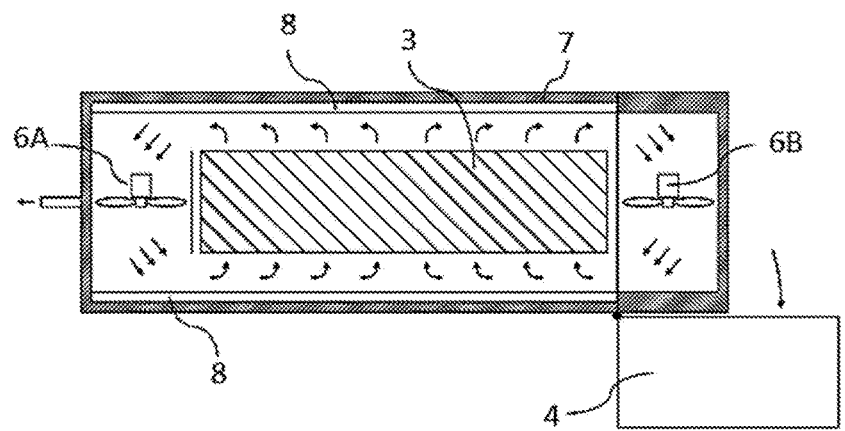
Figure 4:
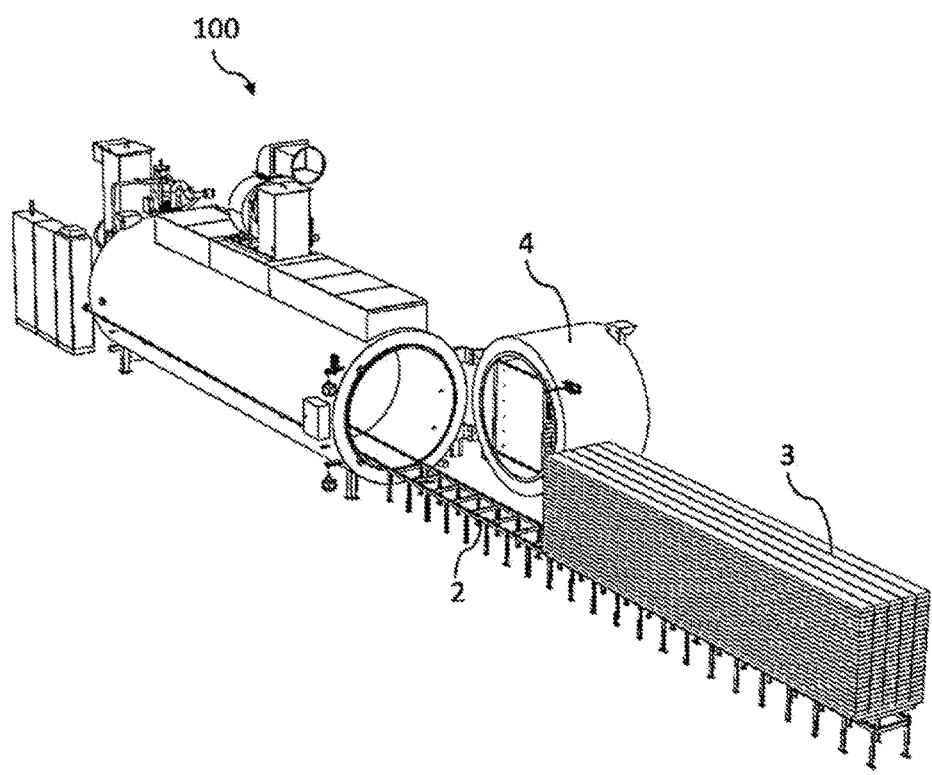

Three possible non-limiting embodiments of the apparatus 100 will be described herein below:
CONFIGURATION 1: as per Example in FIGS. 1a-1c, with direct electrical resistor heating and air jacket cooling;
CONFIGURATION 2: as per Example in FIGS. 2a-2c, with heating and cooling using air-oil heat exchangers;
CONFIGURATION 3: as per Example in FIGS. 3a-3c, with diathermic oil jacket heating and air-oil heat exchanger cooling.

After anticipating the three possible configurations, let us consider the descriptive analysis in more detail for each individual intended application:
CONFIGURATION 1: Apparatus with Heating by Electrical Batteries and Air Interspace Cooling

DESCRIPTION OF THE APPARATUS

Figure 1B:
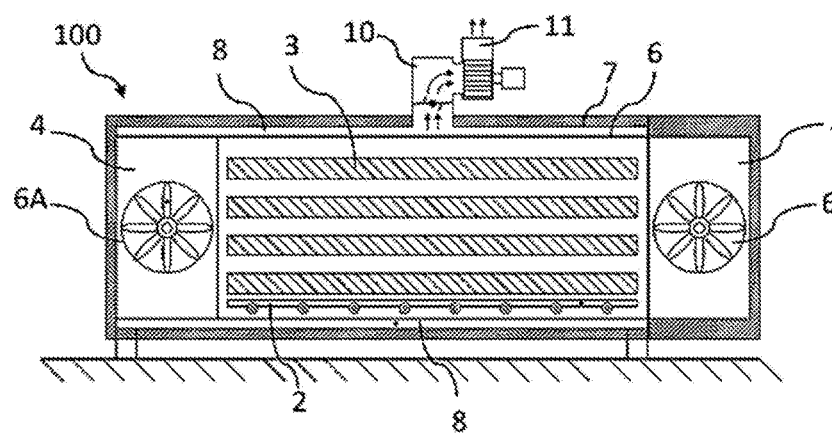

With reference to FIGS. 1a-1b, in the Example illustrated the apparatus 100 comprises the following elements:
a vacuum-tight treatment cell 1 (also referred to as "autoclave-cell") comprising a cylinder 6 preferably in stainless steel defining a treatment chamber suitable to house the wood mass;
a loading carriage 2 on which the wood stack to be thermo-chemically treated 3 is arranged, formed by layers of wood planks and/or semifinished articles separated one from the other by spacer strips to allow the passage of the heating fluid;
a vacuumtight port 4;
a heating system comprising electrical resistor batteries 5A and 5B;
a ventilation system comprising, in the Example, two fans 6A and 6B that provide, through the circulation of internal air, for the transfer of the thermal energy from the heating batteries to the wood;
a case, preferably in steel 7, concentric to the treatment cell 1 and forming an interspace 8 therewith: such an interspace communicates with the atmosphere inferiorly via a hole 9 extending through the entire length of the interspace, and superiorly through the suction manifold 10, the air shut-off valve 17, and the fan 11;

a vacuum pump unit, composed of the suction tube 12, the condenser 14, a condensed vapour collection and storage reservoir 15, and the vacuum pump 13;

The cell is thermally insulated from the external environment by means of the insulation 16.

The description of the operation of the apparatus 100 as a vacuum drier will be omitted, since it is already known, in that it has been the object of a number of patents granted in the past to the Applicant, and being a part of the know-how licensed by the Applicant to a number of companies, both in Italy and abroad (for example, U.S. Pat. No. 4,223,451; Italian patent 1187959).

Operation of the Apparatus in Accordance with Configuration 1

After loading the wood stack 3, i.e., the wood mass to be treated, on the special carriage 2 and feeding the carriage into the treatment cell (autoclave) 1 through the port 4, it is hermetically sealed by means of special devices.

At this point, the actual treatment cycle can be started, that consists, as seen in the introduction, in the sequence of the following 3 steps:

STEP 1: pre-heating of wood
STEP 2: actual treatment
STEP 3: cooling of the wood mass Step 1: Pre-Heating of Wood During this step, the fans 6A and 6B (according to the teachings of the Italian patent No 1187959 by the Applicant regarding the longitudinal-lateral "LO-LA" type ventilation system) provide for the circulation of the internal air through the heating electrical batteries 5A and 5B and the wood stack, so as to transfer the thermal energy produced by them to the wood itself (of course, it is possible to arrange differently the batteries and fans, provided that the fluid circulation is equally efficient).

Preferably, a system of at least two temperature probes 18 immersed in the air flow allows measuring the temperatures upstream and downstream the wood stack, and consequently carrying out the adjustment thereof according to the program set by the operator.

At the same time, the vacuum pump system provides to suck the air from within the cell 1 until the desired absolute pressure value is reached and maintained.

According to the need, such value can range between 70 mBar and the atmospheric pressure (1023 mBar) until when the internal temperature of the treatment chamber is less than 180° C., that is, the temperature at which a beginning of combustion can be triggered in the wood; subsequently, the apparatus 100 proceeds to decrease the pressure to a value ranging between 70-350 mBar so as to ensure that, once the pyrolysis beginning temperature has been reached, the internal atmosphere is already extremely poor in oxygen, so that, as seen, the amount of "burnable" wood material due to redox phenomena between the residual oxygen and the carbon in the wood is infinitesimal and produces the desired "self-inertization" phenomenon.

A temperature probe 18, located in a hole drilled in the middle of a wood plank that has been selected as a sample, allows measuring and adjusting the thermal-chemical treatment temperature, generally ranging between 180° C. and 230° C., which can be reached in a number of successive steps and/or with a desired slope according to the type of wood, the thickness thereof, etc.

Step 2: Actual Thermal-Chemical Treatment.

Once it has been assessed, by means of a special wood core probe 18, that the wood mass has reached the desired treatment temperature, the device provides to maintain such temperature constant for the time period set by the operator, the duration of which depends on the result of changes in the characteristics of the wood to be obtained (colour, durability, hygroscopicity, etc.), on the wood thickness, its type, etc.

In this step the fans, and, when needed, also the heating batteries, as well as the vacuum pump unit that provides to maintain the pressure in the cell at the operative value, also ranging according to the needs between 70 and 350 absolute mBar, are active.

The vapours and gases possibly produced by the wood mass during the treatment are sucked by the vacuum pump 13, which provides to convey them, via the tube 12, through the condenser 14, where they are cooled to the dew temperature, and then converted into the liquid phase, collected in the storage reservoir 15, from where they can be extracted at the end of the cycle and sent, if needed, to the disposal according to the requirements of law.

Step 3: Cooling of the Wood Mass

At the completion of the treatment step, the wood is at a temperature of 180-230° C., thereby it cannot be extracted from the cell if not after being cooled in an inert atmosphere until it falls below 80° C., to avoid its exposure to the environment air when it is still at a temperature that is dangerous for the combustion, to not subject it to harmful thermal shocks, and, finally, to allow the handling thereof without risk of burns for the operator.

The method used to cool the wood is new and original, and consists in subjecting the entire outer surface of the autoclave-cell 1 to a forced flow of fresh environment air, so as to create, through the wall of the cell itself, a large temperature differential between the interior (180°-230° C.) and the exterior (25° C.), thus generating a corresponding thermal energy flow according to the known laws of thermodynamics, where the amount of heat transferred to the external environment is equal to:

$$Q = k\ S(Ti - Te)\ \text{where:}$$

K=coeff. of thermal exchange of steel AISI 304
S=autoclave-cell outer surface
Ti=internal temperature of the cell=180-230° C.
Te=average temperature of the external air=25° C.

from which we understand the high efficiency of the autoclave-cell when considered as a total surface air-air heat exchanger.

The cooling operations consist in opening the air shut-off port 17, activating the fan 11, which, through the upper manifold 10, provides for the withdrawal of the fresh environment air from the lower hole 9 and to pass it into the interspace 8 with such a speed as to generate a turbulent flow, which, by touching externally the wall of the treatment cell 1, produces a rapid cooling thereof, thus establishing, as seen, a highly efficient thermal exchange between the interior of the cell (with its entire wood content) and the environment air, without mutual direct contact: thanks to this thermodynamic measure, the cell wall is converted into a high efficiency total surface gas-air heat exchanger.

The internal fans 6A and 6B, which produce, as seen, the circulation of the internal air, provide to subtract the stored heat of the wood and to send it to the inner surface of the treatment cell wall, through which the thermal exchange and the transfer of thermal energy to the circulating fresh air current into the interspace 8 take place.

All of this takes place in an absolute respect for the environment, since there is no contact and/or mixing between the internal fluid (mixture of air, vapours, and wood gases) and the cooling air. Of course, the hot air exiting the fan 11 may be, during the winter months, recovered and used to heat industrial buildings.

Once the wood has been cooled to the desired temperature, it is possible to open the watertight door 4 and withdraw the carriage.

CONFIGURATION 2: Apparatus with Heating and Cooling by Means of Heat Exchangers

Figure 1C:
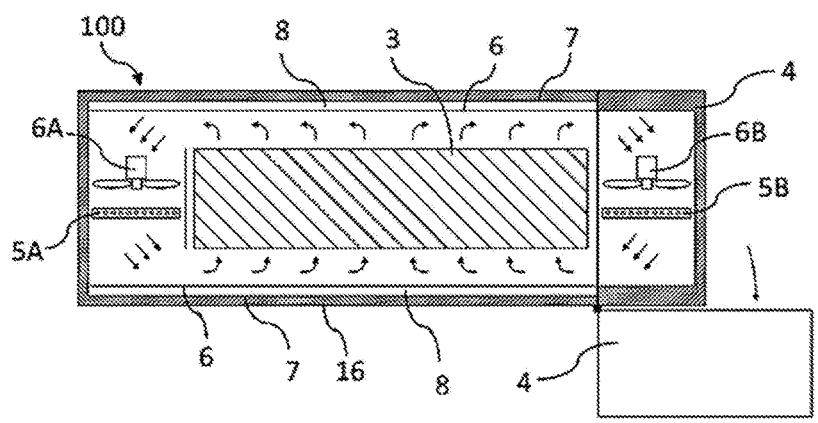

The process is substantially equal to that previously described with reference to the FIGS. 1a-1c, with the following technological variants (see FIGS. 2a-2c):

the heating of wood is obtained by means of internal radiators 15A and 15B in which diathermic oil, heated by a special boiler 27, is circulated; in the Example, these internal radiators are provided combined with the corresponding fans 6A, 6B;

the cooling of wood is obtained by deflecting, via the 3-way valve 18, the diathermic oil flow from the boiler to the external cooling radiator 20, in the Example, associated to a fan 6C, so as to establish a flow of thermal energy from the radiators 5A and 5B arranged in the cell (at high temperature) to the environment air.

In the Example illustrated, a pump 19 is provided for the forced circulation of diathermic oil.

For the drying and the actual treatment, all the measures described with reference to the FIGS. 1a-1c may apply.

CONFIGURATION 3: Apparatus with Diathermic Oil Jacket Heating and Air-Oil Heat Exchanger Cooling.

The physical process is substantially similar to that described with reference 1a-1c, with the following technological variations (see FIGS. 3a-3c):

heating is obtained via an interspace 8 external to the wood heat treatment cell 8, in which, through a pump 19, the diathermic oil heated by a special boiler 27 is circulated, so that the entire cell wall becomes a total surface heat exchanger, since it externally absorbs heat from the diathermic oil and internally conveys it to the air within the cell, which air is circulated by the fans 6A and 6B tangentially to the same wall, then deflected while passing through the wood stack 3;

cooling is obtained by circulating the diathermic oil through an external air-oil heat exchanger 20 capable of cooling the oil and then, through a thermal exchange of the inner surface, the wood contained in the treatment cell 1.

For the drying and the actual treatment, see what has been already described with reference to FIGS. 1a-1c.

As shall be apparent from what has been described above and as confirmed by tests in the field, a process and an apparatus of the type described above allow fully achieving the intended aims.

I claim:

1. A process for the thermal-chemical modification treatment of wood, the process comprising the steps of:
   (a) drying the wood at one or more temperatures in the range of 50° C.-100° C. and one or more absolute pressures in the range of 50-350 mBar; and
   (b) heating the wood by exposing the wood to one or more temperatures in the range of 180° C.-240° C., at which point pyrolysis begins, in a vacuum autoclave-cell while maintaining an absolute pressure in the range of 70-350 mBar; the heating of the wood being accomplished by transfer of thermal energy by one or more fans to circulate the air within the cell; the heating of the wood comprising eliminating the oxygen in the vacuum autoclave-cell by first reducing the oxygen present in the cell with a partial vacuum; and then converting all remaining oxygen present in the cell into carbon dioxide by reacting it with carbon contained in the wood.

2. The process according to claim 1, wherein all steps occur within a single vacuum autoclave-cell.

3. The process according to claim 1, wherein one of step (a) or step (b) occur within a single vacuum autoclave-cell.

4. The process according to claim 1, wherein one of steps (a)-(b) is carried out in a partial vacuum through a forced circulation of a mix of inert gases in a closed circuit through the wood including a source of thermal energy selected from the following: electricity, diathermic oil or superheated water.

5. The method of claim 4, wherein the source of thermal energy is diathermic oil heated by an external boiler in internal radiators; and further comprising the step of:
   (c) cooling the wood to a temperature of below 100° C. by deflecting the diathermic oil flow from the external boiler to an external cooling radiator, so as to establish a flow of thermal energy from the internal radiators to the environment air.

6. The process according to claim 1, wherein the partial vacuum maintained in the vacuum autoclave-cell during the treatment is used both to prevent vapours or gases from escaping from the cell, and to lower the evaporation temperature, and consequently the dew point of the vapours or gases, so that the vapours or gases during the cycle are converted into the liquid phase through a condenser, allowing them to be recovered for disposal.

7. The method of claim 1, further comprising the step of:
   (c) cooling the wood to a temperature of below 100° C. by subjecting the entire outer surface of the cell to a forced flow of fresh environment air while maintaining no contact or mixing between the fresh environment air and the air contained within the cell.

8. The method of claim 1, wherein the source of thermal energy is an internal cylindric jacket in the wall of the cell and filled with diathermic oil; and further comprising the step of:
   (c) cooling the wood to a temperature of below 100° C. by circulating the diathermic oil through an external cooling radiator to establish a thermal exchange with the air within the cell.

* * * * *